Aug. 26, 1958 T. A. McMULLIN 2,849,667
SERVO SYSTEMS
Filed May 10, 1954
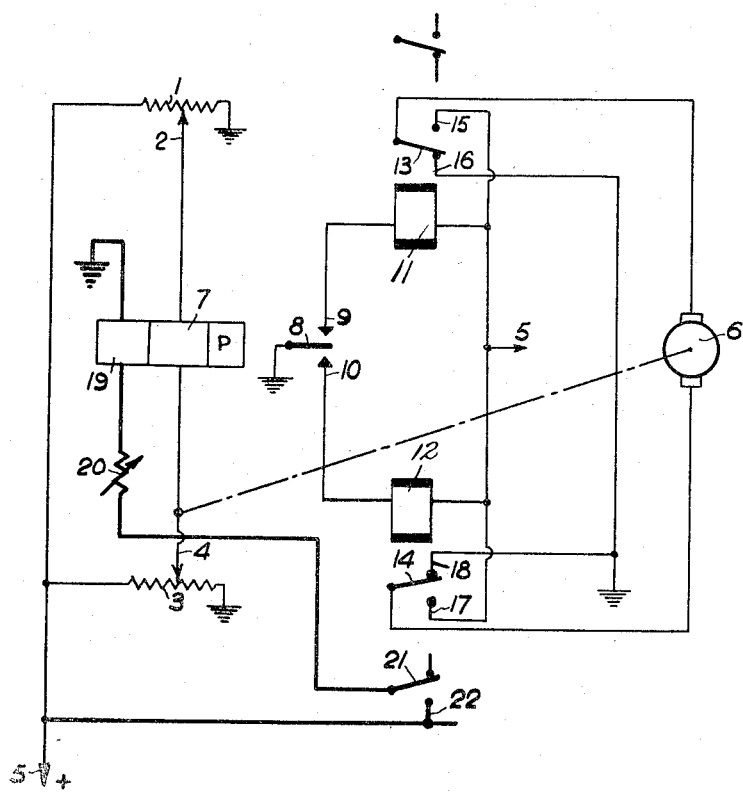
INVENTOR
Terence Alexander McMullin
BY
ATTORNEY Patented Aug. 26, 1958

2,849,667
SERVO SYSTEMS

Terence Alexander McMullin, Welwyn Garden City, England, assignor to Murphy Radio Limited, London, England, a British company Application May 10, 1954, Serial No. 428,729

Claims priority, application Great Britain May 15, 1953

6 Claims. (Cl. 318—28)

This invention relates to servo mechanisms—as defined by, for example, L. A. MacColl in "Fundamental Theory of Servo Mechanisms"—wherein the master device or controller and the slave device or controlled variable are each capable of variation in opposite senses.

In any such mechanisms there is inevitably some small range of variation of the controller on each side of the position or condition which exactly corresponds with the setting of the slave device or the value of the controlled variable, within which the mechanism will not be set in operation; in other words the slave device in response to any control movement assumes a position which differs a little from the position truly corresponding to the controller setting; it should preferably reach this position without first over-running in order that there may be no possibility of instability. There will therefore be a gap between the position which the slave device reaches as a result of movement of the controller in one sense and that which it reaches as a result of movement of the controller in the opposite sense. The gap should be as small as possible, but it will vary in any given servo mechanism because of uncontrollable variables such as temperature, friction or other conditions affecting, or characteristic of, the particular system in question. Also, in the manufacture of servo systems of any particular pattern there will be a number of tolerances involved with the result that one mechanism will not be exactly like another; and if the tolerances are so chosen that over-running never occurs the gap between the two positions of the slave device corresponding with a given setting of the controller may be undesirably wide. The maximum gap thus determined by the tolerances of manufacture and variations in conditions of use sets a limit to the allowable loop gain.

The present invention includes a method of reducing the range of possible equilibrium positions of the slave device for a given position of the master device. It consists broadly in changing the relation of master and slave devices for which the servo is in equilibrium while, and only while, the system is in action in one sense; so soon as such action ceases and while the system is in action in the opposite sense the equilibrium relation is restored to normal. In other words the servo mechnism is given a bias while operating in one sense the effect of which is to cause the mechanism always to overshoot the position of equilibrium when operating in one sense; the bias being removed when the mechanism ceases to operate in that sense the mechanism will always approach the true equilibrium relation in that direction or sense in which it has no bias.

In many cases the input of a servo mechanism is not varied by hand; in such cases it is practically necessary and in all cases it is desirable to effect the introduction of bias into the system automatically. This may be done by causing the servo mechanism itself to introduce the bias, when, and only when, it is acting in one sense.

A principal object of the invention is a servo mechanism made so to operate that the slave device approaches the position of equilibrium always from the same direction, that is to say its final adjustment is always in the same sense.

A more specific object of the invention is a servo mechanism including a relay the circuit of which is dependent on the relation between the master and slave devices, and the action of which is to adjust the slave device in one sense or the other according to the direction of flow of the current exciting the relay, and also to bring into circuit in one direction of adjustment an additional winding on the relay.

Other objects of the invention will sufficiently appear from the following description.

The invention may be further explained with reference to its application to the common "on-off" or relay type of servo mechanism in which the slave device is adjusted by an electric motor the circuit of which is controlled by relays.

The single figure of the drawing is a schematic circuit diagram of one embodiment of my invention.

In the drawing the master device is represented by a potentiometer consisting of a resistance 1 and a shifting contact 2. This may be regarded as typical, for whatever the nature of the master device it will generally be possible to associate a potentiometer with it, the contact of which is shifted by adjustment of the master device. Similarly the slave device is represented by a potentiometer consisting of the resistance 3 and a movable contact 4. The master device does not supply the power required to operate the slave device. That comes from an independent source assumed to be an electrical source connected between the positive terminal 5 and earth. Power is supplied to the potentiometer by a motor 6 which is indicated as mechanically connected with the moving contact 4. The function of the rest of the servo mechanism is to set the motor 6 in operation in one direction or the other according to the relation between the position of the master device and that of the slave device. This may conveniently be done by the aid of a polarised relay 7 controlling a contact arm 8 moving between fixed contacts 9 and 10. Since this relay should be sensitive it will generally be inconvenient to control the motor directly from it. Preferably, as indicated, the relay controls the exciting circuits of two power relays 11 and 12 operating contacts which are capable of handling motor currents. The relay 11 operates an arm 13 moving between fixed contacts 15 and 16 and the relay 12 operates an arm 14 moving between contacts 17 and 18. The resistances 1 and 3 being connected between the positive terminal and earth have current flowing through them and the potential of the contacts 2 and 4 will depend upon their position. If the contacts are in corresponding positions they will be at the same potential and no current will flow through the winding of the relay 7. If they are not in corresponding positions current will flow through the relay, and it will flow in the one sense or the other according as contact 4 needs to be shifted to the right or left to bring about equilibrium.

For example supposing that the direction of excitation of the relay P is such as to cause its contact arm 8 to make contact with the fixed contact 9 then current will flow from terminal 5 through the relay winding 11, contact 9 and arm 8 to earth so that relay 11 will be excited. This will cause contact arm 13 to make contact with the fixed contact 15 with the result that current flows from terminal 5 through contact 15, arm 13, motor 6, arm 14, contact 18 to earth setting the motor 6 in operation and causing contact 4 to be shifted to a position at which its potential is nearly that of the contact 2.

If what has so far been described were the whole of the servo mechanism it is plain that the contact 4 would move to any new position of equilibrium in the direction in which the contact 2 had previously moved. So the position of equilibrium corresponding with a particular position of the contact 2 might be approached from either direction.

The invention adds to the servo mechanism so far described a bias which, as illustrated, takes the form of an additional winding 19 upon the polarised relay 7. This winding is connected between a contact arm 21 operated by the relay 12 and earth, and in its circuit is an adjustable resistance 20 for the purpose of giving the bias imparted by the winding 19 the optimum value. The contact arm 21 operates between a stop and a contact 22 connected with the positive terminal 5.

Excitation of the relay 11 has the results above described. Excitation of the relay 12 besides setting the motor 6 going in the opposite direction also switches in the winding 19. The effect of this is to alter the value of current through the winding of relay 7 at which the arms 8 resumes its mid-position. The sign of the change is made such that the contact 4 will over-run the position truly corresponding with that of the contact 2, and the contact will come to rest in a false position of equilibrium. But as soon as that happens the circuit of relay 12 is interrupted and the circuit of the winding 19 is consequently interrupted, the bias is removed from the relay 7 which now promptly responds to the lack of correspondence between the positions of contacts 2 and 4 causing the motor 6 to be reversed and to bring back the contact 4 to its true position of equilibrium.

It is true that since the system will be designed, as above explained, to avoid overshoot due to inertia, and risk of instability, the position in which the contact 4 will stop will not be exactly the true position of equilibrium; but the contact will stop in the same position on every occasion on which the contact 2 assumes a particular position, unless there be a change in the value of the excitation at which the contact arm of relay 7 returns to its mid position. So not only will the error in setting be reduced by a half, but also the re-set error will be reduced to insignificance; or; in other words, a given re-set accuracy can be attained with a system of lower loop gain.

It is not essential that the requisite bias should be given to the relay 7 by an additional winding; any means of bias will serve; for example, if the core of relay 7 were within the stray field of relay 12 that could suffice.

Nor is the invention limited to servo systems of the relay type in which the full power of the source of power is applied to effect correction as soon as the error suffices to set the system in action. In the case of continuous systems there is commonly error due to static friction, analogous to error due to relay insensitiveness in relay systems.

I claim:

1. A servo mechanism comprising a master device adjustable in opposite senses, a slave device operable in opposite senses, a source of power for operating the slave device, electrical circuits controlled by both said master device and said slave device and including relay means for applying power to said slave device in one sense or the other according as the master device is adjusted in one sense or the other, said relay means also putting in circuit an additional winding on said relay means when applying power in one sense only to said slave device.

2. A servo mechanism comprising a master device adjustable in opposite senses, a slave device operable in opposite senses, a source of power for operating the slave device, mechanism connecting said source of power to said slave device to operate it in one sense or the other, means connecting said master and slave devices with said mechanism to determine the sense of operation, a source of bias associated with said mechanism and means actuated by and during operation of said mechanism in one sense only for causing said source of bias to shift the equilibrium relation of said master device and slave device.

3. A servo mechanism operable in opposite senses comprising a master device and a slave device, a relay, a circuit for said relay including elements operated by said master device and slave device whereby the relay excitation is dependent on the relative positions of said master device and slave device, power means connected with said slave device to operate it and with said relay to be controlled by it whereby the driving and direction of driving of said slave device are dependent on the relative position of said master device and slave device, biassing means for changing the equilibrium relation of said master device and slave device and means operated by and during the driving of said slave device in one direction only for putting said biassing means in action.

4. A servo mechanism operable in opposite senses comprising a master device and a slave device, a sensitive relay, a circuit for said sensitive relay including elements operated by said master device and slave device whereby the relay excitation is dependent on the relative positions of said master device and slave device, an additional winding on said relay and a constant source of energy for exciting it, two power relays respectively excited by said sensitive relay according to its own excitation, a reversible motor for driving said slave device, power supply circuits for said motor respectively completed by said power relays and causing it to run in opposite directions, and a contact closed by one of said relays only for closing the circuit of said additional winding on the sensitive relay.

5. A servo mechanism comprising a master device adjustable in opposite senses, a slave device operable in opposite senses, a source of power for operating the slave device, mechanism controlled by said master device and slave device for applying power to said slave device to operate it in one sense or the other when said master device and slave device are out of equilibrium relation in one sense or the other, a source of bias associated with said mechanism, and means actuated by said mechanism during operation of said mechanism in one sense only, for applying said source of bias to shift the equilibrium relation of said master device and slave device.

6. A servo mechanism comprising a master device adjustable in opposite senses, a slave device operable in opposite senses, a source of power, a motor for operating the slave device, a polarised relay having an armature movable in opposite directions from a resting position, an exciting circuit for said relay controlled by the settings of the master and slave devices, circuits controlled by said relay armature connecting said motor to the source of power, and a further circuit closed by said relay armature on movement in one direction only including the source of power and a winding upon the relay.

References Cited in the file of this patent

UNITED STATES PATENTS

| 2,460,276 | Bernas | Feb. 1, 1949 |
| 2,534,801 | Siltamaki | Dec. 19, 1950 |
| 2,674,707 | De Mott | Apr. 6, 1954 |